US008527410B2

(12) United States Patent  (10) Patent No.: US 8,527,410 B2
Markki et al.  (45) Date of Patent: Sep. 3, 2013

(54) CONTROL OF BILLING IN A COMMUNICATIONS SYSTEM

(75) Inventors: Outi Markki, Espoo (FI); Olli Andersson, Helsinki (FI); Harald G. Fuchs, Vienna (AT); Tero Loimuneva, Hausjärvi (FI)

(73) Assignee: Nokia Corporation, Espoo (FI)

( * ) Notice: Subject to any disclaimer, the term of this patent is extended or adjusted under 35 U.S.C. 154(b) by 2250 days.

(21) Appl. No.: 10/468,348

(22) PCT Filed: Feb. 19, 2001

(86) PCT No.: PCT/FI01/00159
§ 371 (c)(1),
(2), (4) Date: Feb. 11, 2004

(87) PCT Pub. No.: WO02/067156
PCT Pub. Date: Aug. 29, 2002

(65) Prior Publication Data
US 2004/0133486 A1 Jul. 8, 2004

(51) Int. Cl.
*G06Q 40/00* (2012.01)
(52) U.S. Cl.
USPC .......................................................... 705/40
(58) Field of Classification Search
USPC .......................................................... 705/40
See application file for complete search history.

(56) References Cited

U.S. PATENT DOCUMENTS

| | | | |
|---|---|---|---|
| 4,247,759 A | 1/1981 | Yuris et al. | |
| 5,621,787 A | 4/1997 | McKoy et al. | |
| 5,866,889 A * | 2/1999 | Weiss et al. | 235/379 |
| 5,956,024 A * | 9/1999 | Strickland et al. | 715/717 |
| 6,047,051 A * | 4/2000 | Ginzboorg et al. | 379/130 |
| 6,243,574 B1 * | 6/2001 | McGregor et al. | 455/418 |
| 6,320,947 B1 * | 11/2001 | Joyce et al. | 379/114.2 |
| 6,836,651 B2 * | 12/2004 | Segal et al. | 455/405 |
| 7,058,386 B2 * | 6/2006 | McGregor et al. | 455/405 |
| 2002/0010608 A1 * | 1/2002 | Faber et al. | 705/8 |
| 2002/0033416 A1 * | 3/2002 | Gerszberg et al. | 235/380 |
| 2003/0026404 A1 * | 2/2003 | Joyce et al. | 379/144.01 |
| 2004/0133486 A1 * | 7/2004 | Markki et al. | 705/34 |

FOREIGN PATENT DOCUMENTS

| | | |
|---|---|---|
| EP | 0 367 361 A2 | 5/1990 |
| EP | 0924630 A1 | 6/1999 |

OTHER PUBLICATIONS

On-Line systems approves loans while customer waits. In: Communication News, Sep. 1994, vol. 31, Issue 9, p. 27.

* cited by examiner

*Primary Examiner* — Lindsay M. Maguire
(74) *Attorney, Agent, or Firm* — Alston & Bird LLP

(57) ABSTRACT

The invention relates to the control of billing in a communications network. The objective is to accomplish a mechanism for minimizing credit losses caused by subscribers, while at the same time maintaining good performance of the system. A gateway receives service requests and filters out the requests for which the analysis performed indicates that a credit loss risk is involved. For these service requests an in-advance credit check is initiated. If the credit check indicates that the delivery is permissible, a reservation is made for the amount of money corresponding to the service price, i.e. the said sum is reserved in the subscriber account so that said sum cannot be used by another service request in the meantime. When the service has been delivered successfully, the reservation is confirmed and the said sum is debited from the balance of the subscriber account. Otherwise, the reservation is cancelled.

27 Claims, 6 Drawing Sheets

CONTROL OF BILLING IN A COMMUNICATIONS SYSTEM

FIELD OF THE INVENTION

The invention relates generally to the accessing of services in a communications system. More specifically, the invention relates to a method and an apparatus for controlling billing in connection with service provision. A service here refers generally to a process in which a client contacts a content server and a session is established between the two.

BACKGROUND OF THE INVENTION

The strong growth in the number of Internet users and services provided through the Internet has been one of the most remarkable phenomena in communications in recent years. Another current trend is the strongly increasing use of various mobile terminals, such as laptops, PDA (Personal Digital Assistant) equipment, and intelligent telephones.

These two rapidly evolving network technologies, wireless communication and the Internet, are gradually converging to make the packet switched data services used in the Internet available to mobile users. So far this converging development has been taking place rather slowly, since most of the technology developed for the Internet has been designed for desktop computers and medium or high bandwidth data connections. It has, therefore, been difficult to introduce the IP-based (IP=Internet Protocol) packet services to the mobile environment, which is characterized by less bandwidth and poorer connection stability in comparison to fixed networks, and where the terminals have many fundamental limitations, such as smaller displays, less memory, and less powerful CPUs, as compared to fixed terminals. However, the development of IP-based packet services for the mobile environment will occur at an increasing rate in the foreseeable future. This is partly due to the demand created by the market and partly due to the evolvement of new technologies designed to meet the various requirements of mobile networks, such as sufficient quality of service and data security. The increasing market demand is based on the rapid increase in the popularity of the Internet: Internet users are often also mobile subscribers and thus may also want to use their mobile terminals for services familiar to them from the Internet environment. This commercial demand in turn enables investments necessary for the development of mobile services. The said new technologies include GPRS (General Packet Radio Service), UMTS (Universal Mobile Telecommunication System), and WAP (Wireless Application Protocol), for example. GPRS aims at providing high-quality services for GSM subscribers by efficiently utilizing the GSM infrastructure and protocols. WAP, in turn, defines a set of standard components enabling communication between mobile terminals and servers providing service in the network. WAP utilizes proxies which connect the wireless domain with the WWW domain.

The introduction of services in these new network environments is not a straightforward task, due to the different network technologies used and the fact that several parties (organizations) are involved. One area to be solved in connection with the introduction of services is the implementation of billing, i.e. how to implement efficient billing processes when an end user who is typically in the wireless domain uses the services provided by the WWW domain. In a typical service architecture the clients access the services through a gateway and a separate entity is provided for managing the actual billing. This entity is in this context called the ISB (Internet Service Broker). The ISB keeps the accounts of the subscribers and performs various functions associated with billing. The ISB also serves as an entity through which the subscribers can subscribe to the services provided by the content servers in the network.

European published Patent Application 924630 describes a service architecture of the above-described kind where a separate proxy server handles access control. In order to find out the price related to a resource requested by a client, the proxy intercepts all resource requests directed to a content server. The proxy caches each request and sends a header request to the content server, requesting the content server to transmit a header associated with the requested resource back to the proxy. The header informs the proxy about the billing and/or access information associated with the requested resource, whereby the proxy authenticates the client's right to receive the requested resource whenever the header indicates that there are billing and/or access restrictions involved. The authentication is performed with an ISB taking care of client identification, authentication, and billing.

When offering the services, the Service Provider (which refers to the party providing the services from the content servers) and the ISB face a credit loss risk if the credit standing of the subscriber has not been successfully verified or the service has not been paid for beforehand. In the case of some subscribers this risk may be acceptable; for them the ISB, the Service Provider or an external party, such as a credit card company, takes the responsibility for such a risk.

However, from the point of view of the ISB and/or the Service Provider, it would be desirable to be able to verify the liquidity of all those subscribers to which to a credit loss risk is associated. These subscribers are typically prepaying customers, whereby the verification would involve checking that the current balance of the subscriber account is sufficient for the service in question. On the other hand, for performance reasons it is most often not possible to check the account balance of such subscribers at the beginning of each transaction to ensure that the subscriber is capable of paying the service requested by him/her. This applies especially to large ISB systems serving a number of gateways through which the services are accessed.

The objective of the invention is to obtain a solution for the above problem in a service environment where an acknowledgment of a successful delivery of the service is available for most services. This acknowledgment can be available, for example, from the application level implementation, from the service transport protocol layer, or from a logistical information base.

SUMMARY OF THE INVENTION

The objective of the invention is to devise a mechanism which minimizes the credit losses caused by subscribers who lack sufficient credit standing or are not paying their bills, while at the same time taking performance into account so that no substantial degradation of the system is caused.

This objective is achieved with the solution defined in the independent patent claims.

According to one aspect of the present invention, a method for controlling billing in a communications network is provided, the method comprising
  receiving a service request from a client, the service request to include a subscriber identifier referring to the subscriber paying for the service and a service identifier referring to a content server,
  analyzing whether a credit check is required prior to delivery of the service, performing said credit check, if the analyzing step indicates this is required,
in response to a credit check, making a billing reservation for said subscriber and associating a certain monetary value with said reservation,
forwarding the service request to the content server,
initiating service delivery from the content server, and
deciding whether billing is to be carried out according to said billing reservation.

In the present invention an entity, such as a gateway/proxy, receiving the service requests filters out the requests for which the analysis performed indicates that a credit loss risk is involved. For these service requests an in-advance credit check is initiated, the check indicating whether or not the delivery of the service is allowable. If the credit check indicates that the delivery is permissible, a reservation is made for the amount of money corresponding to the service price. This means that the said sum is reserved in the subscriber account so that said sum cannot be used by another service request occurring while the said service transaction is being carried out. When the service has been delivered successfully, the reservation is confirmed and the said sum is deducted from the balance of the subscriber account. Should the service delivery fail, the reservation is cancelled and the balance left intact.

In the invention the payment method related to the service request is preferably selected from among a plurality of possible payment methods. Some of the payment methods are such that they indicate directly that no in-advance credit check is required. However, certain steps are assigned to each payment method, the steps being performed when the relevant payment method is selected for the service request.

Other features and advantages of the invention will become apparent by reference to the following detailed description and accompanying drawings.

BRIEF DESCRIPTION OF THE DRAWINGS

In the following, the invention and its preferred embodiments are described more closely with reference to the examples shown in FIGS. 1 to 7 in the appended drawings, wherein.

DETAILED DESCRIPTION OF THE INVENTION

Figure 1:
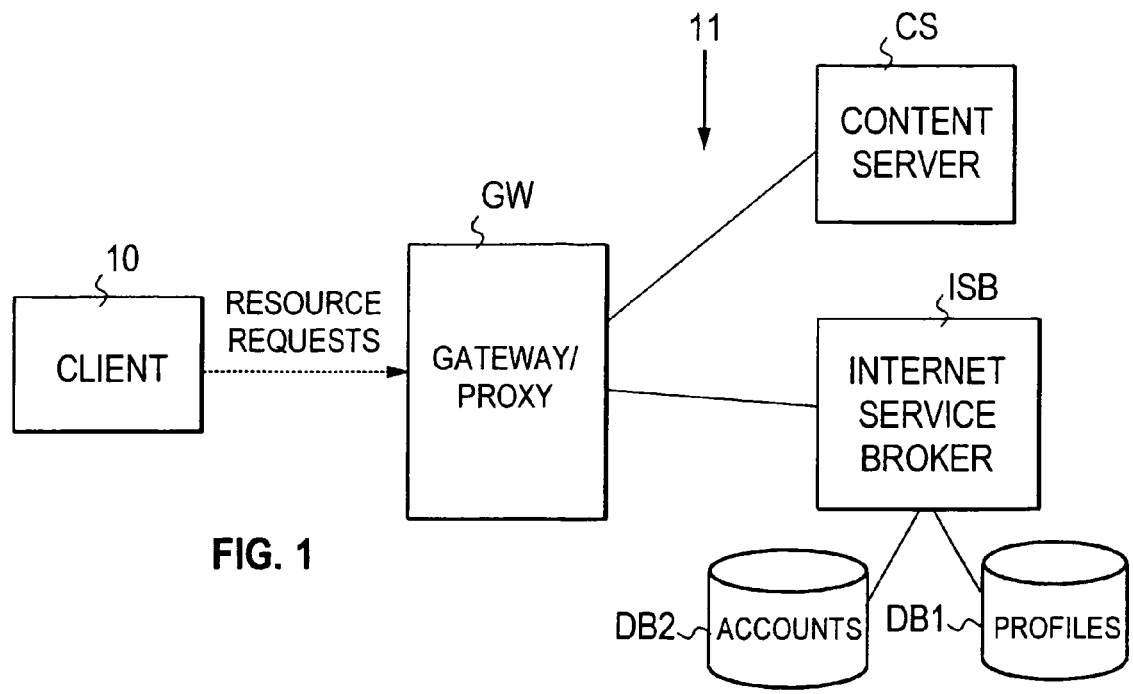
FIG. 1 illustrates the basic architecture of the present invention.

FIG. 1 is a schematic presentation of the system of the present invention. During a service session established in the system, the client typically downloads content or resources from the content server, i.e. from the point of view of the client, the service consists of the retrieval of resources/content from the content server. It is to be noted here that in this context the terms client, subscriber, and customer are used synonymously, although the subscriber or the customer may also be the organization or another person who pays for the use of the service for the actual user.

Clients 10, such as Nokia 7110 or 9110i mobile terminals, request resources (i.e. content) from a network 11 using browsers or other client software by means of which they can communicate with the content servers CS of the network. The service requests (also called resource requests in this context) from the client are directed to a proxy or gateway GW, which saves the requests temporarily in order to analyze them and to decide whether a negotiation with an ISB and/or the client is required before the service is delivered. As discussed above, the ISB is the entity taking care of the billing-related functions. The ISB has access to a profile database DB1 and to an account database DB2. The profile database includes the profiles of the subscribers and the profiles of the services provided from the content servers. Although the account database may include various types of accounts, the accounts relevant in view of the invention are those of the prepaying subscribers. Each prepaying subscriber may deposit money on his/her account and obtain services in return for the money deposited. The invention provides an efficient solution even for a system where the number of types of accounts is high and where an individual subscriber may have different types.

The proxy analyzes the resource request in order to find out the steps to be performed prior to the delivery of the service, so that a good balance is achieved between the credit loss risk involved and the performance of the system. Having performed the said steps, the proxy forwards the request to the content server concerned, provided that provision of the requested service has been approved. The said steps typically include reservation of a certain sum of money for the service by the ISB, whereby the proxy either confirms or cancels the reservation after service delivery, so that the ISB can settle the billing for the service. A reservation is made for at least the services for which an acknowledgment is available to the gateway to indicate whether or not service delivery has succeeded. In practice the gateway can obtain such an acknowledgment for most current services.

As discussed below, the ISB and the gateway/proxy can be combined so as to be located at the same site, and the accounts and the profiles may reside in the same database.

Figure 2:
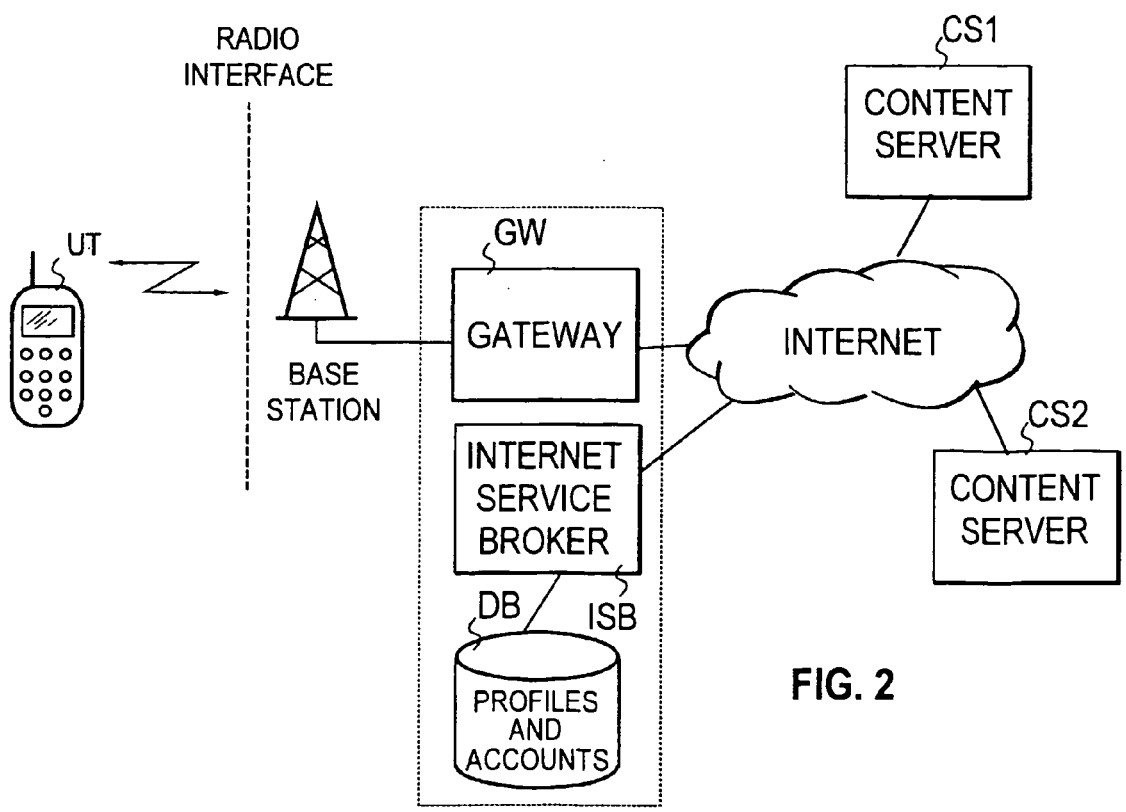
FIG. 2 illustrates the architecture of one embodiment of the present invention.

FIG. 2 is a schematic presentation of the architecture of one embodiment of the invention, the proxy being now a WAP gateway and the client UT being a WAP-compliant terminal. As is known, WAP architecture includes a gateway with encoders and decoders. In order to reduce the amount of data sent via a radio channel to the terminal, an encoder encodes the content received from a server into a compact encoded format. Accordingly, a decoder decodes the encoded data received from a radio channel before the data is forwarded to the server. Due to its role as the operator-controlled intermediary between the radio network and the Internet, the gateway knows the MSISDN number (Mobile Subscriber ISDN Number) of the subscriber related to the client. It is worth noting here that in connection with gateways other than WAP gateways, the authentication of the client may occur in various ways.

The connections between the terminal and the gateway typically use WSP (Wireless Session Protocol), whereas the connections between the gateway and the server typically use HTTP. The gateway, therefore, performs translations from the WAP protocol stack (WSP, WTP, WTLS, and WDP) to the WWW protocol stack (HTTP and TCP/IP). The gateway can also perform content conversion. If the server provides WWW content (such as HTML), the gateway can translate the WWW content into WAP content (WML).

FIG. 2 shows two separate content servers, CS1 and CS2. In this example, it is further assumed that the ISB is located at the gateway, although for this invention the ISB can be anywhere in the network.

Figure 3:
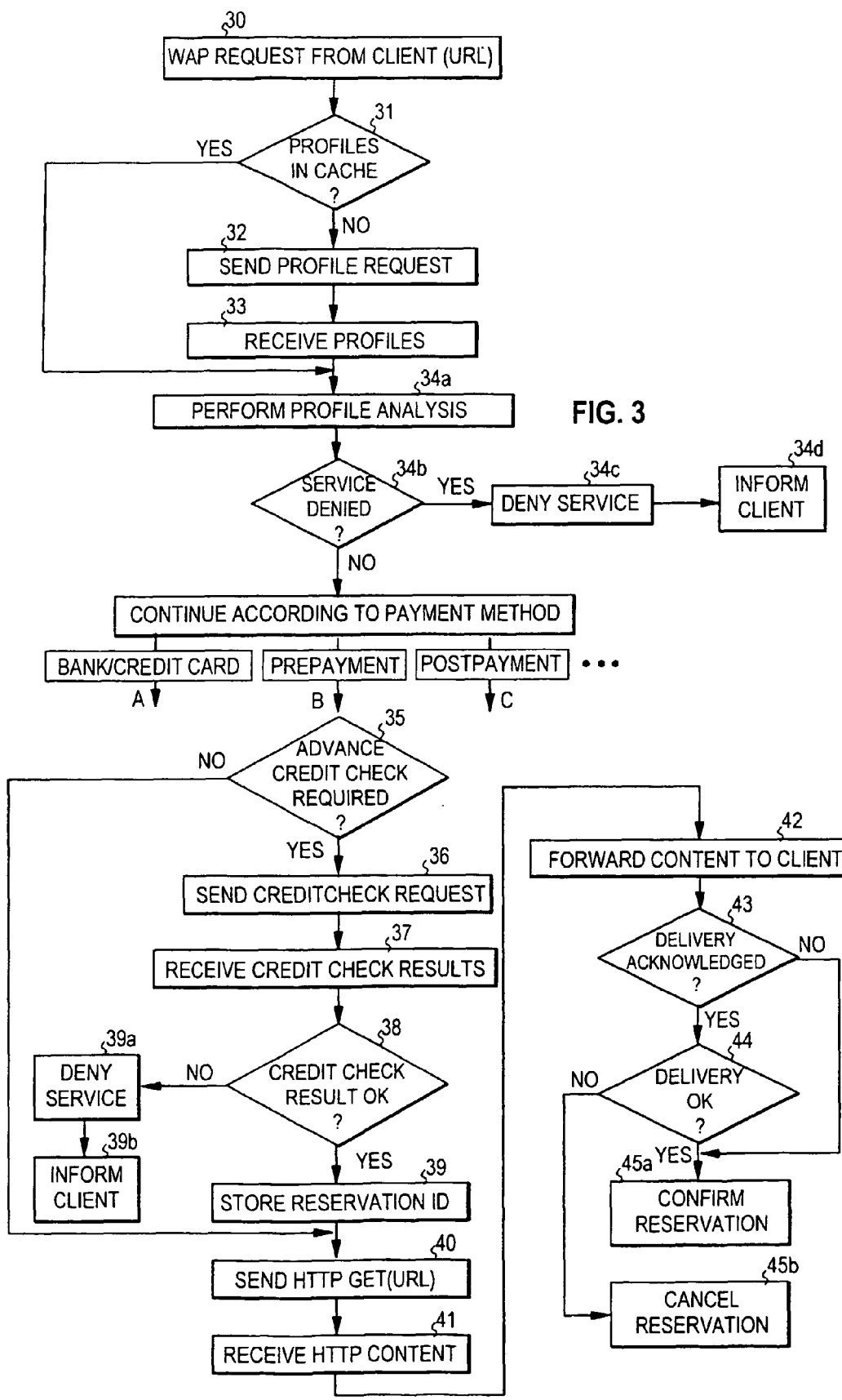
FIG. 3 is a flow diagram illustrating the operation of a proxy in one embodiment of the system.
Figure 4:
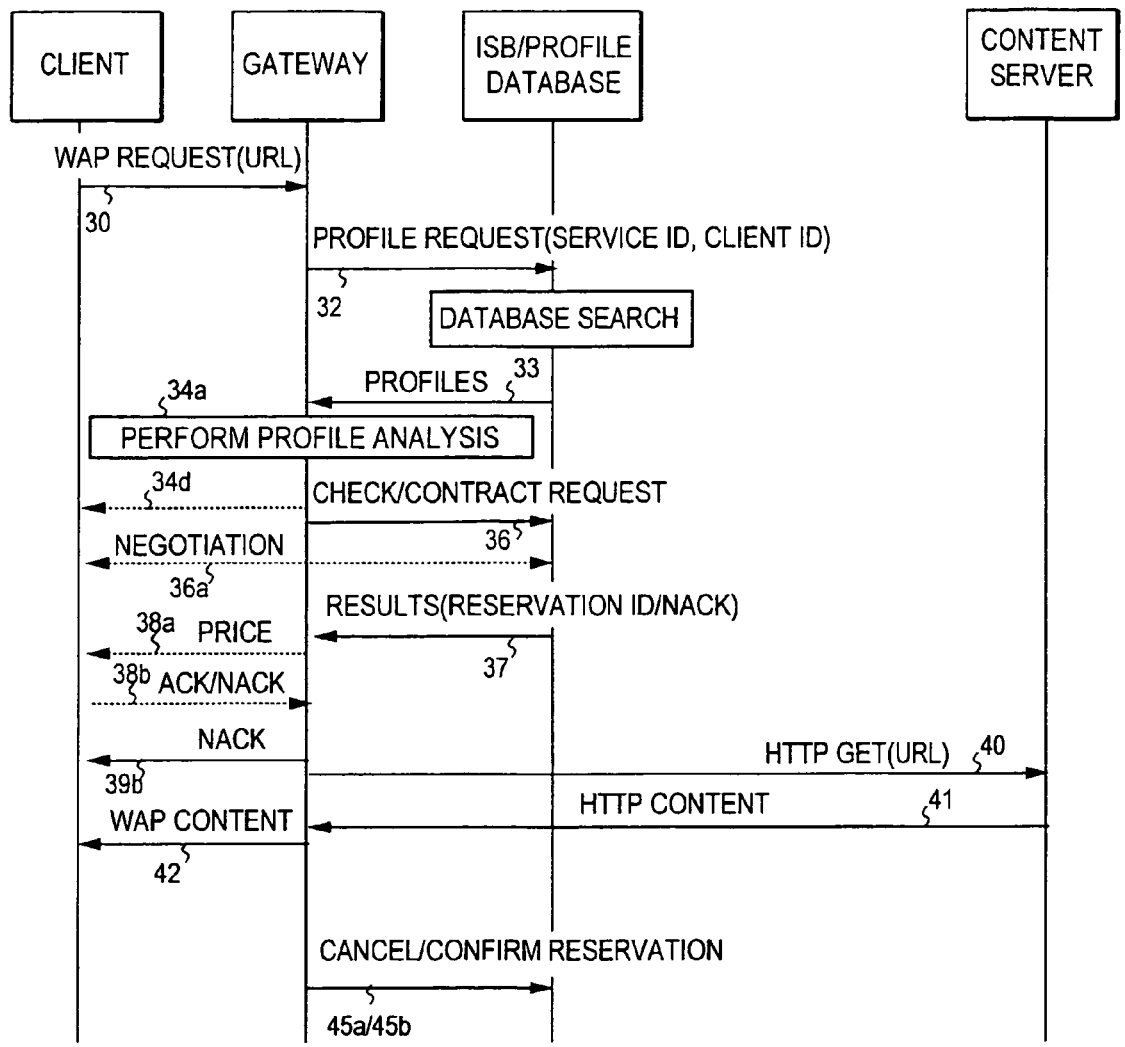
FIG. 4 illustrates a message exchange between the elements of the system.

With reference to the flow diagram of FIG. 3 and to the message diagram of FIG. 4, a sample process of content downloading in the system of FIG. 2 is now illustrated. For the sake of clarity, the reference numerals of the messages in FIG. 4 correspond to the reference numerals of the steps shown in FIG. 3.

When a WAP-compliant client requests content from a content server, the client connects, through a browser, to the operator-controlled gateway GW and sends a GET request with the address, i.e. the URL, of the desired resource (step/message 30). In response to the request, the gateway initiates a process in which it first detects whether it has the profiles of both the subscriber and the service related to the request in its cache (step 31). If the gateway finds that the profiles concerned are not in its memory or are not valid, it sends a profile request to the ISB (step/message 32). This message contains the identifier of the service requested and the identifier of the client (such as the MSISDN or any other subscriber identification that is supported by the proxy and the ISB). The ISB uses these identifiers as the database search keys and returns the profiles to the gateway (step/message 33).

The gateway now has the service and subscriber profiles, which it either retrieved from its memory or received from the ISB. Using these profiles the gateway performs a profile analysis at step 34a. The result of the analysis indicates whether the service is allowable, and if so, which method of payment is associated with this service request. Examples of usual methods of payment are from a prepaid account (i.e. the service is paid from an account containing pre-deposited money), from a postpaid account, and from an external account, such as by credit card or via a bank account. As discussed below, an additional user-confirmed contract can also be combined with any of these methods. At this point, the operation of the proxy branches off according to the method of payment in question, as shown by the branches A to C in FIG. 3. In the case of payment by credit card or through an external organization, such as a bank, the proxy sends the ISB a request to initiate a negotiation with the server of said organization. In case of post-payment, the proxy and the ISB continue their operation in a manner known as such for billing the services the customer has already used, i.e. for these customers the decision has been made that the credit loss risk is acceptable.

As discussed below in connection with FIGS. 5a and 5b, analysis can be carried out in order to select from among many different payment mechanisms. The analysis may also indicate that a user-confirmed contract is required for payment. The contract proposal is then sent to the user for confirmation. The contract proposal includes service details and billing parameters, and it may also include optional payment methods for user selection, if the analysis has indicated that several methods are possible/allowed. The contract negotiation can be based on different levels of security and authentication, such as PKI (Public Key Infrastructure) and the MSISDN. The gateway sends a contract request to the ISB, which then starts contract negotiation with the client. The said request is denoted by arrow 36 in FIG. 4, whereas the said negotiation is denoted by arrow 36a.

In the following it is assumed that the method of payment is prepayment, the method the invention is mainly intended for, as an unwanted credit loss risk relates to prepaying customers. For the sake of simplicity, the test for the need of a contract is not shown in FIG. 3, whereas it is shown below in connection with FIGS. 5a and 5b. On the basis of the profile analysis performed, the gateway then decides whether a credit check is needed prior to delivery of the service to the client (step 35). In an affirmative case, the gateway sends a credit check request to the ISB (step/message 36). This request (which in spite of the same reference numeral is a different message as compared to the above-mentioned contract request) typically includes the subscriber and service identifiers which the ISB uses to determine a price for the service. However, the message can also include said price, i.e. the proxy can determine the price for the service.

The ISB finds out from the account database the current balance of the subscriber account and compares the balance to the price of the service in order to ascertain whether delivery of the service can be approved. If the delivery can be accepted, the ISB generates a reservation identifier for the service and assigns the price to it. The ISB then informs the gateway of the results of the credit check (step/message 37). If the service is allowed, the message includes the reservation ID generated by the ISB. In the opposite case the message includes information indicating that the balance in the subscriber account is not enough for the service.

The gateway reads the content of the message and determines (step 38) whether the ISB has authorized the gateway to continue the transaction for service provision. If this is the case, i.e. if there are sufficient funds in the account of the subscriber or credit can be given to the subscriber, the gateway stores the reservation ID temporarily, creates an HTTP session with the content server concerned and sends a GET request for the content specified by the URL (step/message 40). The content server processes the request and sends the HTTP content to the gateway (step/message 41), which then forwards it as the encoded WAP content to the client (step/message 42). In addition to the above steps, the client can be informed of the price of the resource after the gateway has noticed that the ISB has acknowledged successful billing, so that the client has a chance to accept or reject the price. Since the client typically knows the price of at least some services in advance, these steps, denoted by reference marks 38a and 38b in FIG. 4, are optional. Moreover, if a contract has been made earlier, these steps are unnecessary.

If the ISB does not acknowledge a credit/contract request, which the gateway has detected at step 38 (i.e. if it gives a negative response to the corresponding request), a service denial message informing the client of the situation is returned to the client (step/message 39b). The gateway can also redirect the request to an info page, such as a top-up page, explaining the reason. Furthermore, if it is detected at step 35 that no in-advance credit check is required, the gateway jumps directly to step 40 and creates the above-described HTTP session with the content server. Aside from a favorable profile analysis of credit standing, another reason for waiving an in-advance credit check can be that the requested service is free of charge, or that the charge is nominal so that the ISB is ready to take any small credit loss risk associated with the service currently requested.

In this embodiment of the invention the gateway then analyzes whether the delivery of the service is to be acknowledged (step 43), i.e. whether or not a report on the success/failure of the service delivery is to be sent to the ISB. The result of this analysis can depend on various criteria, such as the current load level and/or the service characteristics. The ISB can also automatically order the gateway to switch to a reduced traffic mode (i.e. to a mode where no reports/delivery acknowledgments are sent to the ISB). This can occur at peak times, for example. Thus, in one embodiment of the invention this feature is configurable, whereby the traffic between the gateway and the ISB can be reduced during desired time periods by temporarily switching off the feature of sending acknowledgment.

If the gateway finds that a report is to be sent to the ISB, it then examines whether or not the delivery succeeded (step 44). This can be determined on the basis of various data, such as whether or not the client has acknowledged the service delivery. If the delivery was successful, the gateway confirms the reservation made by the ISB by sending the ISB a confirmation message (step/message 45a) including the reservation ID, whereby the ISB debits the balance of the subscriber account by the sum associated with the reservation ID. If the delivery was not successful, the gateway cancels the reservation by sending the ISB a cancellation message (step/message 45b), which includes the reservation identifier, whereby the ISB cancels the reservation and leaves the balance intact.

There are several implementation alternatives as to where and how the payment server can obtain the delivery acknowledgement information. Thus, the operation of the invention will vary depending on the actual implementation. These various alternatives are discussed briefly in the following.

If a reliable transport/session layer protocol is used, for example, the delivery acknowledgement is available at the transport/session protocol level. The proxy/gateway can send the acknowledgement received from the transport/session layer to the payment server, or the payment server can poll the acknowledgement status data from the proxy/gateway.

If the service transport/session layer between the content server and the terminal or between the proxy/gateway and the terminal is unreliable and not acknowledging successful transmission, then the acknowledgement function can be implemented in the application layer of the terminal. The application layer is responsible for the reliable delivery of acknowledgement information to the proxy/gateway or to a separate information database, or directly to the payment server.

The content can also be digitally protected and when it is read, a delivery acknowledgement message can be triggered at the application level to be sent directly to the payment server without passing it through the proxy/gateway or to a separate information base.

The payment server can also actively poll the delivery acknowledgment from a separate logistical information base or from the proxy/gateway to where the information about acknowledgments is transferred/gathered.

It is also possible that no information about the success or failure of delivery is available to the gateway regarding some services. If this is the case, the gateway jumps from step 43 directly to step 45a and confirms the reservation.

Since it is statistically more likely that the service delivery will succeed, the ISB can also assume successful delivery by default. Therefore, the ISB may debit the account after a predetermined time-out, for example, unless a cancellation message arrives before the time-out period has expired. The ISB may then collect unsuccessful delivery logs from a logistical information base and compensate for the charges already made for these deliveries.

By using the above-described reduced message traffic between the gateway and the ISB, the performance of the system can be improved, especially in distributed systems where many gateways communicate with the ISB.

As can be seen from the above flow diagram, the gateway filters out the requests for which the payment method, and possibly also other parameters, indicate that unacceptable credit loss risk is involved. For these service requests the gateway initiates an in-advance credit check to determine whether or not delivery of the service can be allowed. If the credit check indicates that delivery is permissible, the ISB makes a reservation for the amount of money corresponding to the service price, whereby the said sum cannot be used for another service request in the meantime. When the service has been delivered successfully, the reservation is confirmed and the balance of the subscriber account is debited by the said sum. Should the service delivery fail, the reservation is cancelled and the balance is left intact.

Figure 5A:
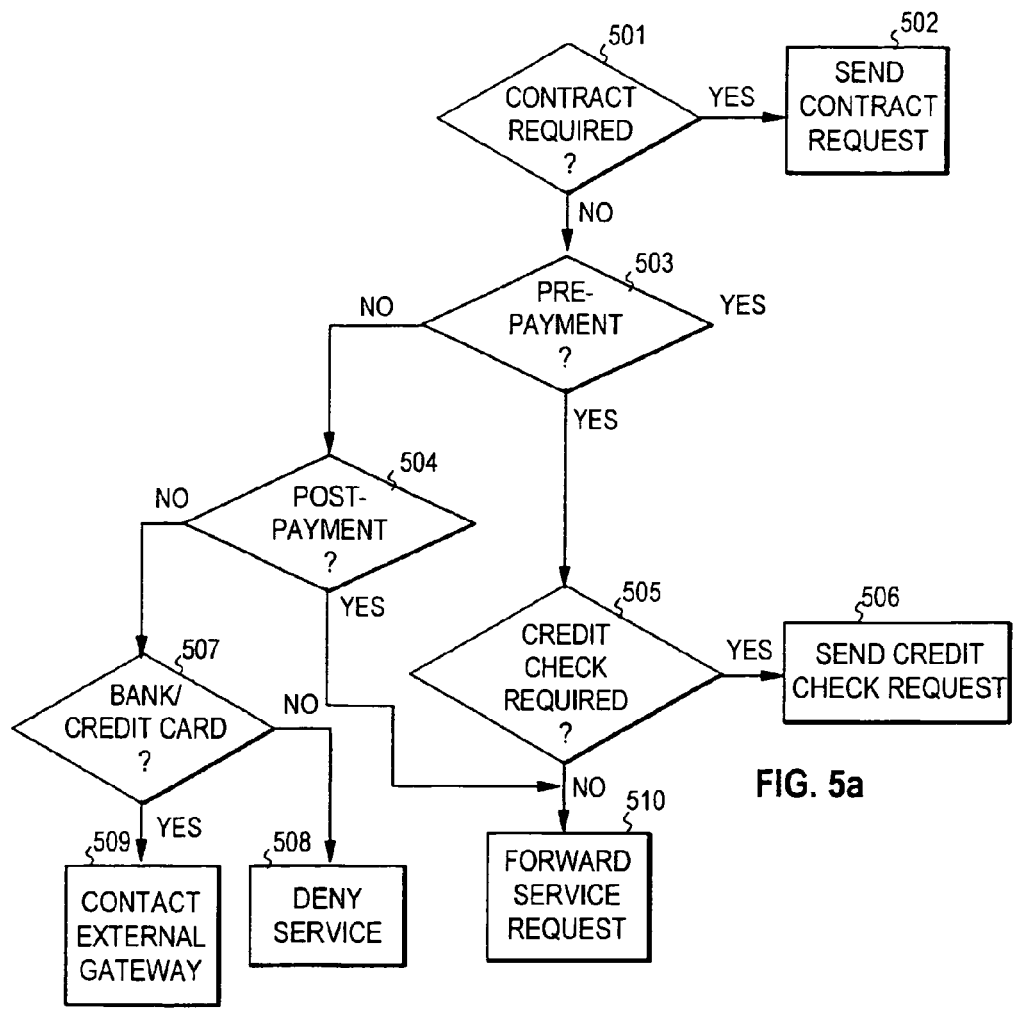
FIG. 5a is a flow diagram illustrating the branching of the operation of the gateway on the basis of the payment method selected.

FIG. 5a illustrates a flow diagram of a sample profile analysis (steps 34a to 36 in FIG. 3). The idea here is that the network element receiving the service request, (i.e. the gateway), will go through a predetermined set of rules for selecting a proper payment mechanism and for deciding whether the operation of the gateway is then to continue according to the payment mechanism indicated by the analysis. The subscriber and/or service characteristics extracted from the subscriber and service profiles form the input data for the analysis, although it is possible to use further parameters describing the service environment, such as the time of day. Thus, the payment method is not necessarily tied to the subscriber but may be dependent on other factors too. For example, a subscriber may have to prepay for some services, while post-payment is permissible for other services.

A sample subscriber profile typically contains at least the following information:
  the identity of the subscriber, for example, the MS-ISDN, the IMSI, or any other subscriber identification supported by the proxy and the ISB, such as the name of the subscriber, or a combination thereof,
  the status of the subscriber (i.e. active, barred, new, etc.)
  the subscribed services,
  access control data, indicating, for example, the services allowed or not allowed for the subscriber, and
  the payment methods available for the subscriber.

Some subscribers may have very high credibility and can thus use the services in a postpaid mode up to a high monetary limit, whereas some subscribers may have to use all the services in a prepaid mode regardless of the monetary value of the service.

Each service can have a profile of its own or the services can be grouped so that the services within a certain group have a common group profile.

A sample service profile typically contains at least the following information:
  the identity of the service, such as the URL,
  the type and the name of the service,
  the details of the Service Provider, such as the name, address, contact persons, etc.,
  the payment methods accepted for the service,
  tariffing/pricing information, and
  the price limits of the service.

As described in FIG. 5a, the gateway first examines whether a contract is needed for the service session (step 501). If this is the case, the gateway sends the contract request to the ISB (step 502). If a contract is not needed, the gateway examines whether prepayment or post-payment is involved, or whether the payment is to be through an external organization, such as a bank or a credit card company (steps 503, 504 and 507). If the service request does not relate to any of these payment methods, the service is denied (step 508). If the payment comes through an external organization, the gateway asks the ISB to contact the external server in question or contacts the said server itself (step 509). If prepayment is required, the gateway checks whether an in-advance credit check is further required (step 505). If this is the case, the gateway sends the ISB the credit check request (step 506). In case of a service request for which post-payment is allowed, the need for an in-advance credit check is not examined.

Figure 5B:
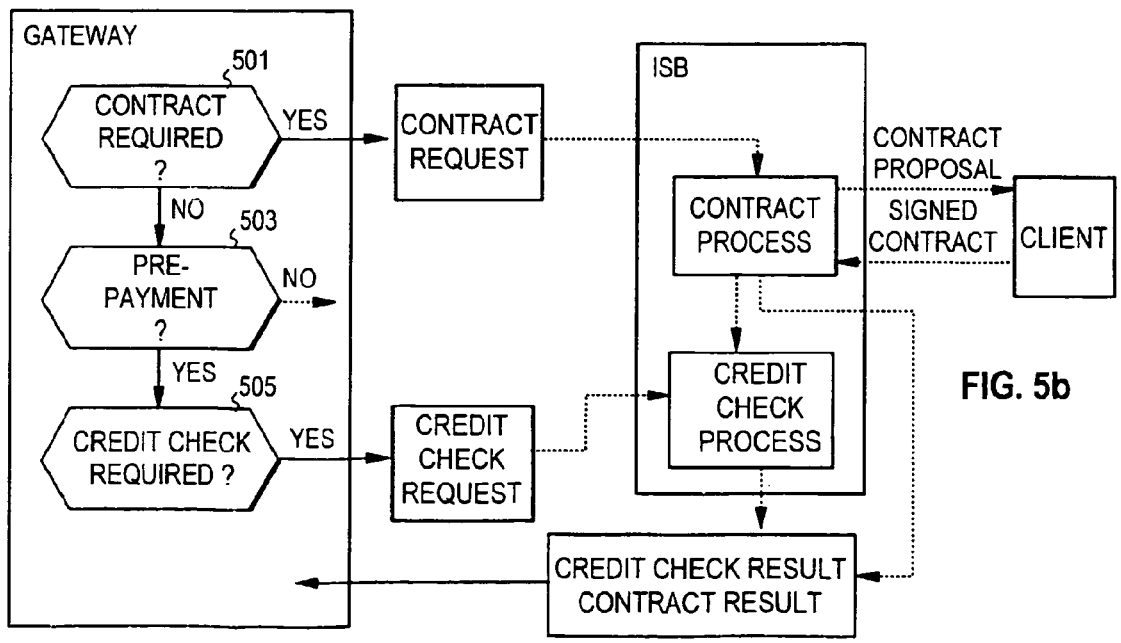
FIG. 5b illustrates the operation of a proxy and an ISB in connection with a contract negotiation.

FIG. 5*b* illustrates the operation of the proxy and the ISB in connection with a contract negotiation. If a contract is needed, the gateway sends the ISB the above-described contract request. This message preferably includes the service and subscriber profile data so that the ISB can decide if an in-advance credit check is also needed. The ISB opens the contract negotiation by sending the contract proposal to the client. As mentioned above, the proposal includes the service details and billing parameters, and it may also include optional payment methods for user selection. As a result of user acceptance, the client terminal returns to the ISB the contract message it received from there. However, the message to be returned further includes the selections made by the user and, optionally, a digital signature as a sign of user acceptance. The ISB then decides whether a credit check is needed. If this is the case, the ISB performs said check and returns the results to the gateway, together with the contract details. If a credit check is not needed, if the user selects a payment method not requiring the said check, for example, the ISB skips the credit check and sends the contract results/details to the gateway. If a credit check is performed and the result of the check is positive, the message returned to the gateway includes the reservation identifier, i.e. the ISB generates the reservation identifier in connection with a credit check indicating that the service can be allowed, regardless of whether the credit check request arrives from the gateway or from its internal contract process.

Figure 6:
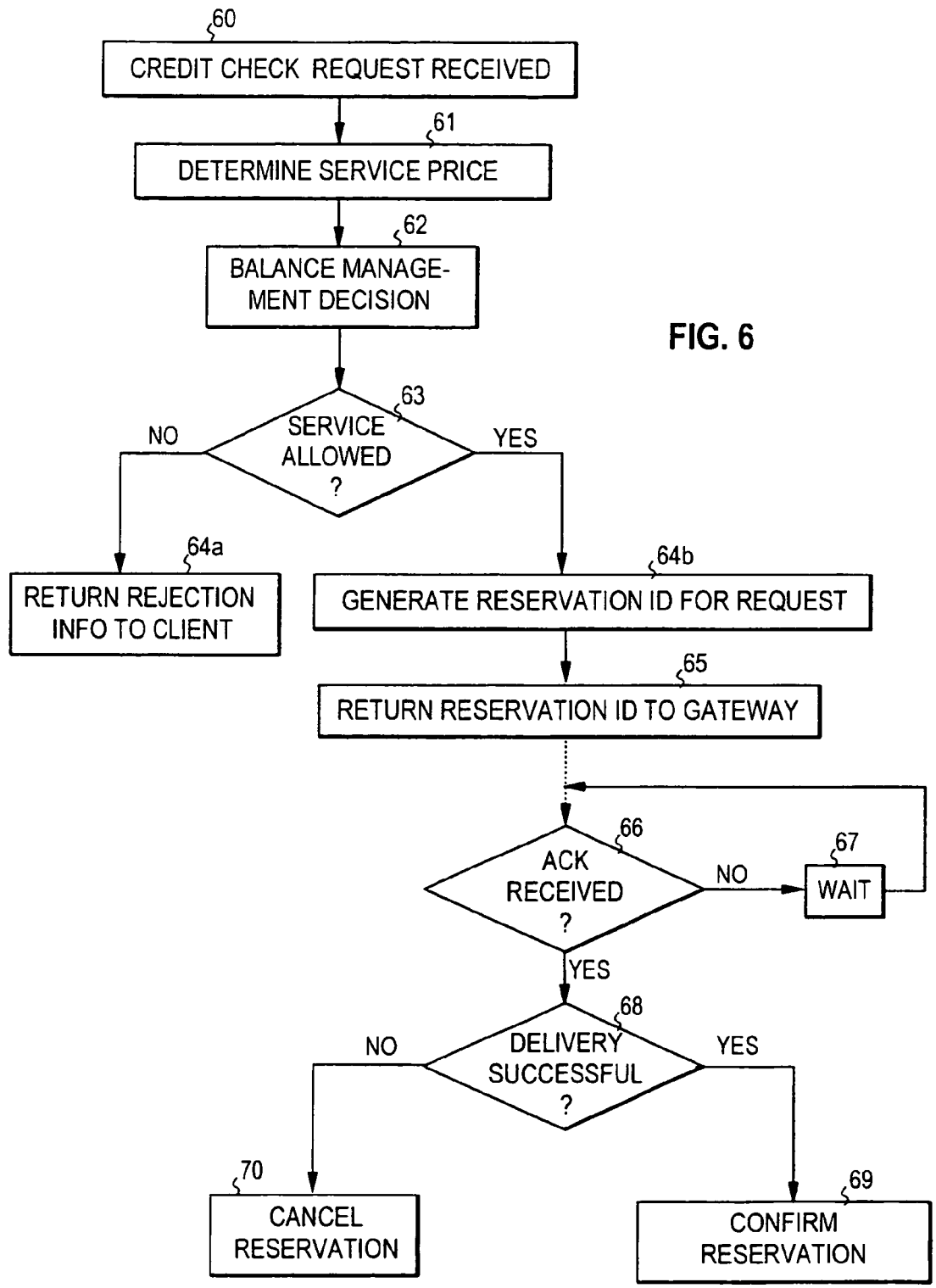
FIG. 6 is a flow diagram illustrating the operation of an ISB in one embodiment of the invention.

FIG. 6 is a flow diagram depicting the operation of the credit check process when a credit check request arrives from the gateway or from the contract process of the ISB (step 60). If the request does not include any price for the service, the ISB first rates the service, i.e. determines the price in monetary units. The ISB then selects the method to be used for maintaining a local balance in the ISB (step 62). The method, which is called below the balance management method, controls the manner in which balance management actions are performed internally in the ISB to optimize its performance. This step will be discussed in more detail below in connection with FIG. 7.

The ISB then performs a balance analysis on the basis of the price and other parameters, such as the current balance of the subscriber account (step 63). If the result of the analysis indicates that the service can be allowed, the ISB generates a reservation ID for the request and assigns the price to the said ID (step 64*b*). The ISB then sends the ID to the gateway (step 65) and waits for the service delivery acknowledgment from the gateway (steps 66 and 67). When the acknowledgment arrives, the ISB examines whether or not the delivery was successful (step 68). In the event that the delivery was successful, the ISB confirms the reservation and debits the balance in the subscriber account by the amount indicated by the reservation ID (step 69). In response to this, the reservation is deleted. In the event that the delivery failed, the ISB simply cancels the reservation leaving the balance of the account intact (step 70).

Figure 7:
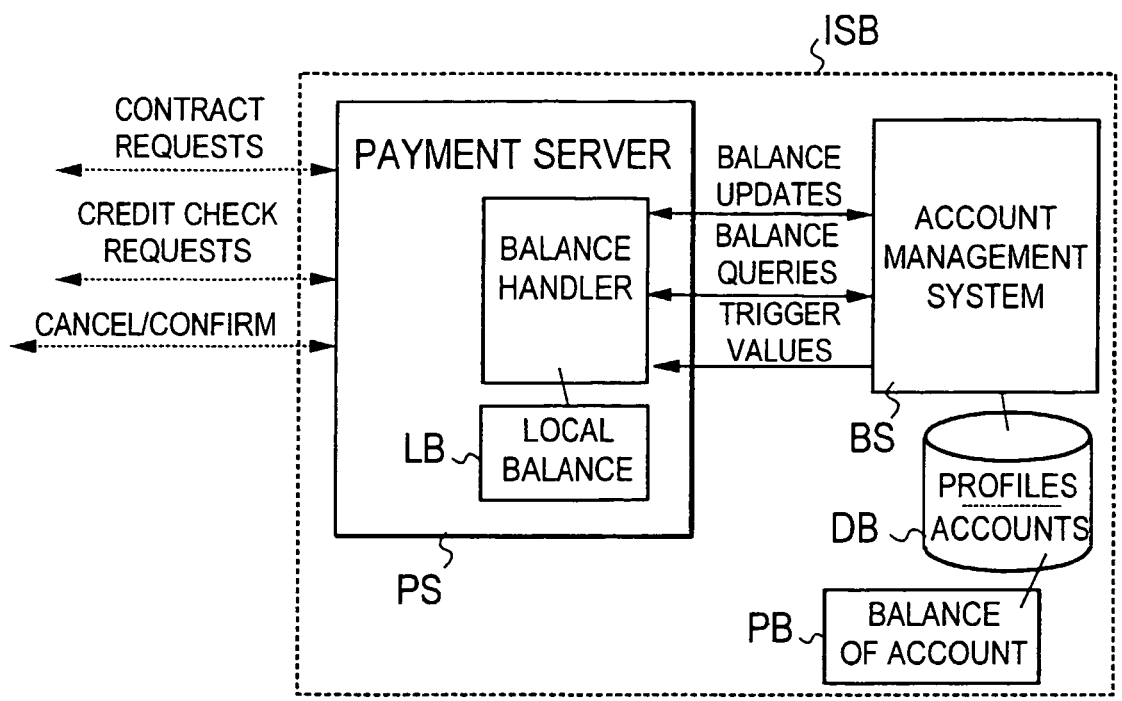
FIG. 7 illustrates the internal operation of an ISB in one embodiment of the invention.

In a typical practical environment, the ISB is divided into two logically separate modules, as shown in FIG. 7. The first module forms a payment server PS, which is the entity communicating with the gateways of the network. The second module forms the actual billing system BS, which manages the account and profile databases. The second module is in this context termed the account management system. The payment server is thus the entity forming the interface towards the network, i.e. it receives the requests and the acknowledgments from the gateway(s). As the account management system is the actual billing party and susceptible to the highest load, it is desirable to optimize the traffic between the payment server and the account management system in order to reduce the load of the account management system. For this purpose a local balance of each prepaying subscriber is maintained in the payment server, i.e. for each prepaying subscriber the ISB contains a primary balance PB in the account management system and further a local balance LB in the payment server. The ISB can then make some decisions on the basis of the local balance only, without loading the actual account management system.

In order to keep each other informed of the balance information of the other party, the payment server and the account management system transmit to each other balance updates and balance queries. In addition to these messages, one of the parties, preferably the account management system, can control the mutual traffic between the two by sending the other one (payment server) trigger values indicating when the said other party (payment server) is to contact the sending party (the account management system).

According to the invention, at least three different types of balance management methods can be used for optimizing the traffic between the payment server and the account management system. The different methods are here termed as the "simple forwarding method", the "borrowing method", and the "full balance synchronization method". These methods are discussed in the following.

If the payment server uses the simple forwarding method as the balance management method, the subscriber-specific local balance contains a cumulative sum of the charges generated since the latest balance update was performed between the payment server and the account management system.

The local balance preferably contains for each account the sum (LB1) of the money reservations already confirmed ($CMR_i$, i=1,2, ...), the sum LB2 of the money reservations not yet confirmed (MRi, i=1,2, ...), and the total of these two (LB3):

$$LB1 = \sum_{i=1}^{i=n} CMR_i$$

$$LB2 = \sum_{i=1}^{i=n} MR_i$$

LB3=LB1+LB2 where LB refers to the local balance, CMR refers to the confirmed money reservations, and MR refers to a money reservation not yet confirmed.

There can be several money reservations open at any one time. The time between the generation of the reservation and the confirmation/cancellation of the same depends on the application. The confirmations are not necessarily performed in a sequential order; older reservations may remain open while newer ones are already being confirmed or cancelled.

Below is an example of the balance update mechanism which can be applied with the simple forwarding method:

---

IF the time elapsed since the latest balance update ≧ predetermined period
OR
IF the number of new committed reservations in LB1 ≧ predetermined limit -continued

```
OR
   The number of new money reservations in LB2 ≧ predetermined limit
then
   IF the latest Account Balance − LB3 ≦ Next Update Trigger Value
   AB3
   OR
   The latest Account Balance − LB1 ≦ Next Update Trigger Value AB1
   OR
   The latest Account Balance − LB2 ≦ Next Update Trigger Value AB2
   THEN transmit (LB1, LB2, LB3) to the account management system
   and get updated Trigger Values (AB1, AB2, AB3) from the account
   management system to the payment server.
Else
   Return.
```

Thus, in this example the payment server calculates the difference between the latest account balance and each of the LBi values (i=1,2,3) if at least one of the three uppermost conditions is true. The payment server then compares each of the three differences to the corresponding trigger value. If any of the differences is smaller than or equal to the corresponding trigger value, the payment server transmits the current values of LBi (i=1,2,3) to the account management system and receives new trigger values in response.

The new trigger values can be based, for example, on watermark levels defined for the account. This means that the values of the triggers can vary depending on the current balance. Typically, the less money in the account, the shorter the distance between the trigger values.

The above-mentioned borrowing method refers to a method whereby the payment server either borrows money from the account management system for its local balance or transfers a certain sum of money to a virtual purse, whereby the balance of the purse forms the local balance. The difference between the local balance and the virtual purse is that the unused money is not returned from the virtual purse to the account management system. A common feature of the local balance and the virtual purse is that the payment server asks the account management system for more money when the balance sinks below a certain threshold. The amount of money borrowed or transferred at a time can depend on the current balance of the account in the account management system, the subscriber's pattern of the use of the services and/or on the credit class of the subscriber, for example.

The third payment method referred to above is the full balance synchronization method. In this method the local balance of the payment server and the balance in the account management system are maintained in synchronization as accurately as possible. In the simplest embodiment, all balance updates are forwarded directly to the other system, i.e. the payment server forwards the updates of the local balance directly to the account management system and the account management system directly forwards a balance update of the primary balance to the payment server. In a more optimized embodiment, a balance update mechanism is used by both parties to control the sending of balance updates to the opposite party. As an example, both parties (i.e. both the payment server and the account management system) can include a balance update mechanism similar to the one described in connection with simple forwarding cases.

The full balance synchronization method is useful when there are other systems frequently debiting the account in the account management system, in addition to the gateway(s) described above.

Besides the above three balance management methods, direct access to the account of a (prepaying) subscriber can be used. This means that neither the local balance nor the virtual purse are used by the payment server. Instead, the payment server forwards all balance-related events or messages directly to the account management system. With this method the overall balance management cannot be optimized. Therefore, the method can be used only when the load of the account management system is low.

Furthermore, when the service is paid by a credit card or from a bank account, the ISB initiates contract negotiations in real-time with an external financial institute, such as a bank. In these cases there is no need for a predetermined balance management scheme, since each transaction is negotiated separately with an external party.

The payment server is provided with predetermined rules for selecting the balance management method. Various criteria, such as the overall load of the account management system, can be used for selecting the balance management method most suitable at any one time. For example, when the load of the account management system is low, direct access to the account can be used. When the load reaches a predefined limit, the direct access method is replaced by the simple forwarding method, for example.

Various rules can be used in connection with each balance management method to control the frequency of the management actions between the payment server and the account management system, and various parameters can be used in connection with these rules. The following list gives some examples of the parameters, which can be used for the rules controlling the said frequency:

the load of the account management system,
   the time that has elapsed since the latest update,
   the amount of money used by the payment server (such as the cumulative charges),
   the balance in the account management system after the latest balance update,
   the credit class of the subscriber, and
   the status of the subscriber during the service session, i.e. whether the subscriber is presently actively using services and therefore also needs the payment services.

As described in connection with FIG. 6, the balance management method is preferably selected before the ISB checks the allowability of the service at step 63. This is because the decision as to allowability typically requires access to the account in the account management system in order to check the balance there, and it is preferable to decide on the balance management method (i.e. the way the account is to be accessed) prior to accessing the account for the first time. In order to reduce the load of the account management system, it is therefore preferable to share the tasks shown in FIG. 6 so that steps 60 to 65 are performed by the payment server, which only queries the account management system for information necessary for these tasks, such as the primary balance possibly needed at step 62. The relevant decision can also be based on the local balance only, at least if the current local balance is greater than the price of the service.

Although the invention was described above with reference to the examples shown in the appended drawings, it is obvious that the invention is not limited to these, but may be modified by those skilled in the art without departing from the scope and spirit of the invention. The method of the invention can also be applied in connection with transacting for outside commodities. In that case the delivery is typically initiated from the content server and the user triggers the delivery acknowledgment message (or authorizes it to be triggered).

The invention claimed is:

1. A method, comprising:
   receiving a service request from a client, wherein the service request includes a subscriber identifier identifying a subscriber paying for the service and a service identifier identifying a content server;

analyzing, by a gateway, in response to receiving the service request from the client, whether a credit check is required prior to delivery of the service;

performing said credit check when the analyzing indicates that the credit check is required;

in response to a credit check, making a billing reservation for said subscriber and associating a monetary value with said billing reservation;

forwarding the service request to the content server;

initiating service delivery from the content server; and billing the client according to the billing reservation in response to the service request being fulfilled and not billing according to the billing reservation in response to the service request not being fulfilled, wherein the analyzing further comprises retrieving service profile data related to said service and subscriber profile data related to said subscriber and using said profile data to determine whether a credit check is required.

2. A method according to claim 1, wherein said analyzing includes selecting a payment method from a group of different payment methods.

3. A method according to claim 2, further comprising:
using, in said group of different payment methods, at least one payment method that directly indicates that the credit check is not required;
assigning intermediate actions to each of said payment methods; and
in response to said analyzing, performing the intermediate actions assigned to the selected payment method, wherein the forwarding is performed in response to said intermediate actions.

4. A method according to claim 3, wherein the intermediate actions include contacting an external server.

5. A method according to claim 2, wherein the analyzing includes the selection of a first payment method in which the service is paid from an account with a pre-deposited money for the service.

6. A method according to claim 1, further comprising:
determining whether a client-confirmed contract concerning the service is required.

7. A method according to claim 6, further comprising:
negotiating said contract with the client.

8. A method according to claim 1, further comprising:
maintaining user-specific accounts in a billing server.

9. A method according to claim 8, wherein said credit checks are performed for service requests for which said first payment method is selected in the analyzing.

10. A method according to claim 8, wherein the maintaining further comprises maintaining a primary balance and a local balance for a subscriber-specific account, wherein the local balance is maintained in a first part of the billing server and the primary balance is maintained in a second part of the billing server, and the maintaining further comprises sending balance update messages between the first part and the second part of the billing server.

11. A method according to claim 10, wherein the local balance contains a cumulative sum of charges generated since the latest balance update between the first part and the second part of the billing server.

12. A method according to claim 10, further comprising:
transferring money from the primary balance to the local balance;
comparing the local balance to said monetary value; and
making said billing reservation on the basis of said comparison.

13. A method according to claim 10, further comprising:
controlling a frequency of said balance updates.

14. A method according to claim 13, wherein said controlling comprises generating trigger values indicating the moment to perform a next balance update.

15. An apparatus, comprising:
at least one processor; and
at least one memory including computer program code, the at least one memory and the computer program code configured to, with the at least one processor, cause the apparatus to at least perform:
receive a service request from a client, wherein the service request comprises a subscriber identifier identifying a subscriber paying for the service and a service identifier identifying a content server,
analyze, in response to receiving the service request from the client, whether a credit check is required prior to delivery of the service,
initiate sending of a credit check request and to receive a billing reservation identifier in response, wherein said identifier identifies a billing reservation that is associated with said subscriber and that indicates a price of the service,
retrieve service profile data related to said service and subscriber profile data related to said subscriber and use said profile data to determine whether a credit check is required, and
determine whether a separate billing server is to receive acknowledgement of service delivery.

16. An apparatus according to claim 15, wherein the at least one memory and the computer program code are configured to, with the at least one processor, cause the apparatus to receive acknowledgements of service delivery, and be responsive to said received acknowledgement.

17. An apparatus according to claim 15, wherein the at least one memory and the computer program code are configured to, with the at least one processor, cause the apparatus to initiate sending of an acknowledgement message containing said billing reservation identifier to the billing server.

18. An apparatus according to claim 15, wherein the apparatus is controllable from said billing server.

19. An apparatus according to claim 15, wherein said at least one memory and the computer program code are configured to, with the at least one processor, cause the apparatus to select a payment method from a group of different payment methods.

20. A method comprising:
receiving a service request from a client, wherein the service request includes a subscriber identifier identifying a subscriber paying for the service and a service identifier identifying a content server;
analyzing, by a gateway, in response to receiving the service request from the client, whether a credit check is required prior to delivery of the service;
initiate sending of a credit check request to a billing server when the analyzing indicates that a credit check is needed;
receiving a billing reservation identifier in response to said credit check request, wherein said identifier identifies a billing reservation that is associated with said subscriber and that indicates the price of the service; and
determining whether a separate billing server is to receive acknowledgement of service delivery, wherein
the analyzing comprises retrieving service profile data related to said service and subscriber profile data related to said subscriber and using said profile data to determine whether a credit check is required.

21. An apparatus comprising:
storage configured to maintain subscriber-specific accounts;
at least one processor; and
at least one memory including computer program code, the at least one memory and the computer program code configured to, with the at least one processor, cause the apparatus to at least perform:
receive credit check requests from a network, wherein each credit check request includes an identifier identifying an account,
check a balance of the account referred to by said identifier,
make a billing reservation for the account to which said identifier refers, and
associate said account and a sum of money with the reservation, wherein
the processor is configured to receive acknowledgements from the network, wherein each acknowledgement includes a reservation identifier identifying a billing reservation,
the processor is configured to retrieve service profile data related to said service and subscriber profile data related to said subscriber and to use said profile data to determine whether a credit check is required in response to receiving a service request from a client, and
the storage is responsive and debits the balance of the account associated with said billing reservation identifier by the sum associated with the billing reservation identifiers.

22. An apparatus according to claim 21, wherein the storage is further configured to relate service profile data to the services provided by the network and to relate subscriber profile data to subscribers of the services.

23. An apparatus according to claim 21, wherein the storage is configured to maintain local balances and primary balances of said subscriber-specific accounts.

24. An apparatus according to claim 21, wherein the at least one memory and the computer program code are configured to, with the at least one processor cause the apparatus to control a separate proxy to control the flow of said acknowledgements.

25. A method, comprising:
maintaining subscriber-specific accounts at a network device;
receiving credit check requests from the network, wherein each credit check request includes an identifier identifying a certain account;
checking the balance of the account to which the identifier refers;
in response to said checking, making a billing reservation for said account, and associating said account and a sum of money with the billing reservation;
receiving acknowledgements from the network, wherein each acknowledgement includes a billing reservation identifier identifying a billing reservation; and
debiting the balance of the account associated with said reservation identifier by the sum associated with the billing reservation identified by the acknowledgement, wherein
service profile data related to said service and subscriber profile data related to said subscriber is retrieved and said profile data is used to determine whether a credit check is required in response to receiving a service request from a client.

26. A method according to claim 25, wherein the maintaining comprises maintaining primary and local balances of said subscriber-specific accounts so that the checking comprises checking at least the local balance.

27. A system, comprising:
first processor means for receiving a service request from a client, wherein the service request includes a subscriber identifier identifying a subscriber paying for the service and a service identifier identifying a content server;
second processor means, responsive to the first means, for analyzing, in response to receiving the service request from the client, whether a credit check is required prior to delivery of the service;
third processor means, responsive to the second means, for performing said credit check;
fourth processor means for generating a billing reservation for said subscriber, wherein said billing reservation indicates a monetary value of said service;
fifth processor means for deciding whether or not billing is to be carried out according to said billing reservation; and
sixth processor means, responsive to the fifth means, for carrying out billing according to said billing reservation, wherein
the second processor means is configured to retrieve service profile data related to said service and subscriber profile data related to said subscriber and to use said profile data to determine whether a credit check is required.

* * * * *

UNITED STATES PATENT AND TRADEMARK OFFICE
CERTIFICATE OF CORRECTION

PATENT NO. : 8,527,410 B2  Page 1 of 1
APPLICATION NO. : 10/468348
DATED : September 3, 2013
INVENTOR(S) : Markki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2294 days.

Signed and Sealed this
Fifteenth Day of September, 2015

Michelle K. Lee
*Director of the United States Patent and Trademark Office*